(12) United States Patent
Strope et al.

(10) Patent No.: US 8,959,020 B1
(45) Date of Patent: Feb. 17, 2015

(54) DISCOVERY OF PROBLEMATIC PRONUNCIATIONS FOR AUTOMATIC SPEECH RECOGNITION SYSTEMS

(71) Applicant: Google Inc., Mountain View, CA (US)

(72) Inventors: Brian Strope, Palo Alto, CA (US); Francoise Beaufays, Mountain View, CA (US); Trevor D. Strohman, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 132 days.

(21) Appl. No.: 13/853,150

(22) Filed: Mar. 29, 2013

(51) Int. Cl.
*G10L 15/18* (2013.01)
*G06F 17/24* (2006.01)

(52) U.S. Cl.
CPC .................... *G06F 17/241* (2013.01)
USPC ......................................................... 704/257

(58) Field of Classification Search
None
See application file for complete search history.

(56) References Cited

U.S. PATENT DOCUMENTS

| | | | | |
|---|---|---|---|---|
| 6,263,308 | B1 * | 7/2001 | Heckerman et al. | 704/231 |
| 6,999,925 | B2 * | 2/2006 | Fischer et al. | 704/243 |
| 7,590,533 | B2 * | 9/2009 | Hwang | 704/231 |
| 2007/0016421 | A1 * | 1/2007 | Nurminen et al. | 704/260 |
| 2012/0271635 | A1 * | 10/2012 | Ljolje | 704/254 |

OTHER PUBLICATIONS

AbuZeina, D. et al., "Arabic Speech Recognition Systems," Chapter 2 of Cross-Word Modeling for Arabic Speech Recognition, Springer, 2012, 8 pages.
Danesi, Charlotte et al., "Impact of Spontaneous Speech Features on Business Concept Detection: a Study of Call-Centre Data," Proceedings of the 2010 International Workshop on Searching Spontaneous Conversational Speech, Oct. 2010, 4 pages.
Dufour, Richard et al., "Automatic Transcription Error Recovery for Person Name Recognition," 13th Annual Conference of the International Speech Communication Association, Interspeech 2012, Sep. 2012, 4 pages.
Fosler-Lussier John Eric, "Dynamic Pronunciation Models for Automatic Speech Recognition," Dissertation of John Eric Fosler-Lusier filed with the University of California, Berkeley, Sep. 1999, 204 pages.
Review: Dragon Dictation—iPhone voice transcription by Dragon NaturallySpeaking, downloaded from the internet on Feb. 26, 2013, http://www.iphonejd.com/iphone_jd/2009/12/review-dragon-dictation.html, 14 pages.
Senay, Gregory et al., "Transcriber Driving Strategies for Transcription Aid System," Proceedings of the Seventh International Conference on Language Resources and Evaluation (LREC '10). May 2010, 4 pages.
Wald, Mike, "Creating Accessible Educational Multimedia Through Editing Automatic Speech Recognition Captioning in Real Time," Interactive Technology and Smart Education, vol. 3, No. 2, Jan. 2006, 12 pages.

* cited by examiner

*Primary Examiner* — Jialong He
*Assistant Examiner* — Yi-Sheng Wang
(74) *Attorney, Agent, or Firm* — Fish & Richardson P.C.

(57) ABSTRACT

Methods, systems, and apparatus, including computer programs encoded on computer storage media, for discovery of problematic pronunciations for automatic speech recognition systems. One of the methods includes determining a frequency of occurrences of one or more n-grams in transcribed text and a frequency of occurrences of the n-grams in typed text and classifying a system pronunciation of a word included in the n-grams as correct or incorrect based on the frequencies. The n-grams may comprise one or more words and at least one of the words is classified as incorrect based on the frequencies. The frequencies of the specific n-grams may be determined across a domain using one or more n-grams that typically appear adjacent to the specific n-grams.

20 Claims, 4 Drawing Sheets

DISCOVERY OF PROBLEMATIC PRONUNCIATIONS FOR AUTOMATIC SPEECH RECOGNITION SYSTEMS

BACKGROUND

This document relates to systems and techniques for automatically selecting words in a system that have problematic system pronunciations and determining potential replacement system pronunciations for the problematic system pronunciations.

Speech recognition systems translate spoken words into text in a process that is known as automatic speech recognition. Some speech recognition systems use training where an individual speaker reads sections of text and the speech recognition system uses the terms and phrases spoken by the user to select a recognition algorithm particular to the speaker.

Some speech recognition applications include voice user interfaces such as voice dialing, call routing, search, and speech-to-text processing. For example, a user can draft an email or a document using a speech recognition system.

SUMMARY

This document relates to systems and techniques for determining a frequency of occurrences of one or more n-grams in transcribed text and a frequency of occurrences of the n-grams in typed text and classifying a system pronunciation of a word included in the n-grams as correct or incorrect based on the frequencies. The n-grams may comprise one or more words and at least one of the words is classified as incorrect based on the frequencies. The frequencies of the specific n-grams may be determined across a domain using one or more n-grams that typically appear adjacent to the specific n-grams.

In general, one innovative aspect of the subject matter described in this specification can be embodied in methods that include the actions of receiving, by one or more computers, transcribed data including one or more first transcribed n-grams, receiving, by at least one of the computers, a corpus of typed text including a plurality of typed n-grams, determining a transcribed frequency for a specific n-gram, the specific n-gram being one of the typed n-grams included in the corpus of typed text, the transcribed frequency being based on a first quantity of occurrences in which the specific n-gram is one of the first transcribed n-grams included in the transcribed data, determining a typed frequency for the specific n-gram, the typed frequency being based on a second quantity of occurrences in which the specific n-gram is one of the typed n-grams included in the corpus of typed text, comparing the transcribed frequency for the specific n-gram with the typed frequency for the specific n-gram, and classifying, based on the comparing, a system pronunciation associated with the specific n-gram as occurring frequently in a plurality of spoken phrases included in the transcribed data or occurring infrequently in the plurality of spoken phrases. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In particular, one embodiment may include all the following features in combination. In some implementations, the method includes receiving one or more spoken phrases, at least one of the spoken phrases including the specific n-gram and each of the spoken phrases including at least one spoken n-gram, obtaining a transcription of at least one of the spoken phrases to determine one or more second transcribed n-grams, at least one of the transcriptions of the specific n-gram being incorrect, and generating the transcribed data from the second transcribed n-grams.

In some implementations, the method includes generating, based on the classifying, one or more candidate phoneme strings for a specific word included in the specific n-gram, determining, for each of the candidate phoneme strings, whether the candidate phoneme string is the same as an example phoneme string, the example phoneme string being selected from an example phoneme string index, determining, for each of the candidate phoneme strings that is the same as one of the example phoneme strings, a candidate phoneme string frequency for the associated candidate phoneme string based on a phoneme string index, and selecting a potential pronunciation for the specific word based on the candidate phoneme string frequencies, the potential pronunciation being from the candidate phoneme strings associated with the candidate phoneme string frequencies. In some implementations, the method includes obtaining a transcription of at least one spoken n-gram using the potential pronunciation for the specific word.

In some implementations, the method includes normalizing one of the transcribed frequency for the specific n-gram or the typed frequency for the specific n-gram. In certain implementations, the normalizing is based on one or more n-grams adjacent to the specific n-gram when the specific n-gram appears in the transcribed data when the transcribed frequency is normalized or based on one or more n-grams adjacent to the specific n-gram when the specific n-gram appears in the corpus of typed text when the typed frequency is normalized. In certain implementations, the normalizing is based on a context associated with the specific n-gram.

In some implementations, the classifying includes determining whether a difference between the transcribed frequency and the typed frequency is greater than a threshold difference value, and classifying, based on determining that the difference is greater than the threshold difference value, the system pronunciation associated with the specific n-gram as occurring infrequently in the plurality of spoken phrases and in need of correction.

The subject matter described in this specification can be implemented in particular embodiments so as to realize one or more of the following advantages. In some implementations, systems automatically detect problematic system pronunciations that are used in automatic speech recognition systems without user input. In some implementations, systems can detect problematic system pronunciations when the n-grams in transcribed data do not exactly match n-grams in a corpus of typed text.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
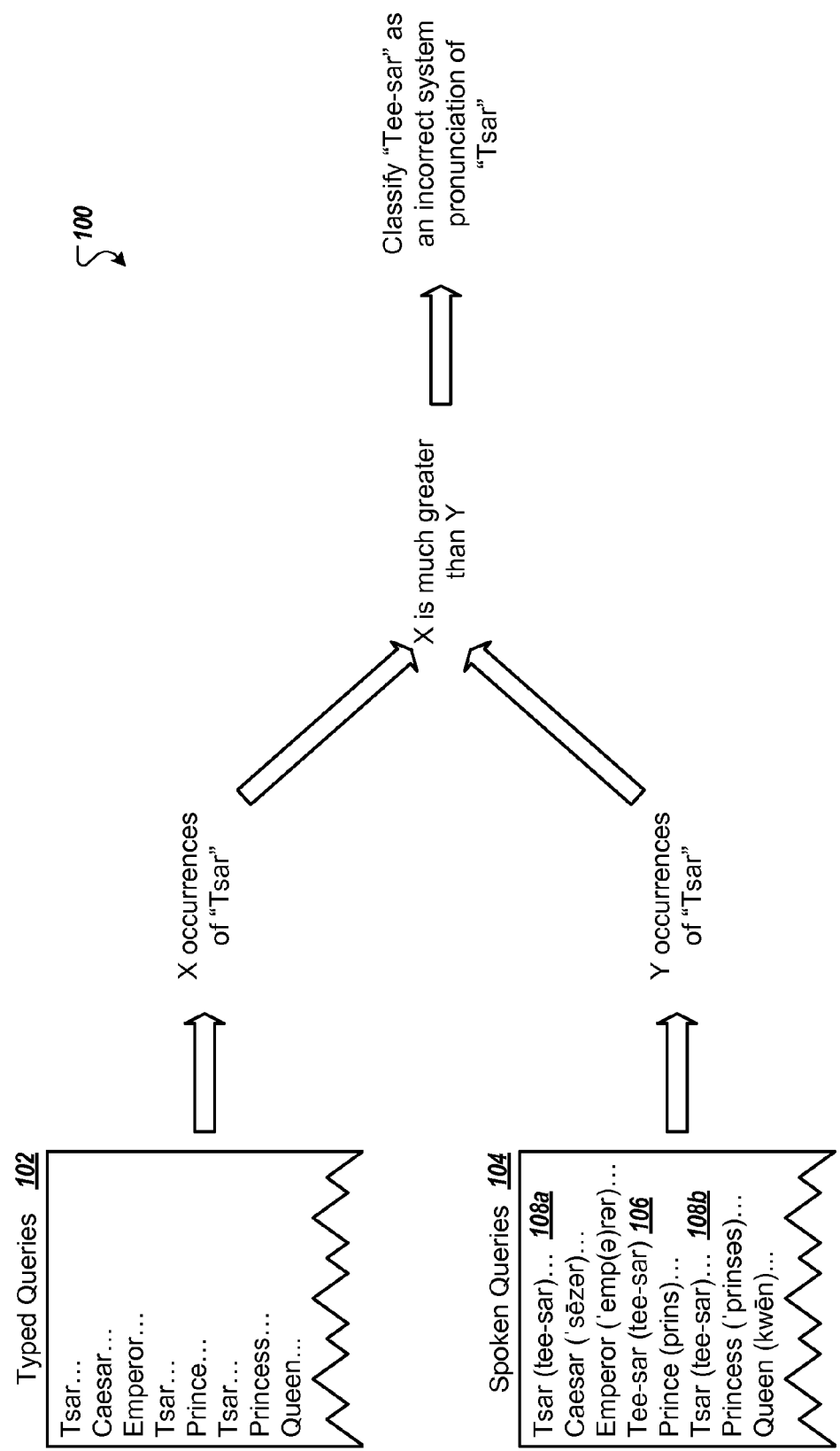
FIG. 1 is an example of a pronunciation system where a system pronunciation is classified as incorrect.

FIG. 1 is an example of a pronunciation system 100 where a system pronunciation is classified as incorrect. The pronunciation system 100 includes a plurality of typed queries 102 that are search queries received from one or more user devices.

The pronunciation system 100 also includes a plurality of spoken queries 104 associated with transcriptions of the spoken search queries, received from one or more user devices, which a transcription system provides to the pronunciation system 100.

The pronunciation system 100 determines the number of occurrences of each n-gram in the typed queries 102. For example, the pronunciation system 100 determines that the n-gram "Tsar" occurs in the typed queries X times, where X is a positive integer.

The pronunciation system 100 also determines the number of occurrences of the n-grams in the spoken queries 104, using the same n-grams as selected from the typed queries 102. For example, the pronunciation system determines that there are Y occurrences of "Tsar" in the spoken queries, where Y may be any non-negative integer.

The pronunciation system 100 compares the number of occurrences X of a particular n-gram in the typed queries 102 with the number of occurrences Y of the particular n-gram in the spoken queries 104 to determine a relationship between X and Y. For example, if the value of X is much greater than Y, indicating that the particular n-gram occurred more frequently in the typed queries 102 than the spoken queries 104, the pronunciation system 100 classifies the system pronunciation of the particular n-gram, or one of the words in the n-gram, as incorrect.

For example, if the system pronunciation of "Tsar" is "Tee-sar," when "Tsar" is included in one of the spoken queries, a transcription of the n-gram may occasionally be correct, such as in the case of correct transcription 106 where a user pronunciation was similar to the system pronunciation, while most of the transcriptions of the n-gram "Tsar" are incorrect, such as in the case of incorrect transcriptions 108a-b.

The pronunciation system 100 determines the number of correct transcriptions of the n-gram "Tsar" in the spoken queries 104 and the number of times that "Tsar" occurred in the typed queries 102 which, after normalization, should be approximately the same. If the two numbers are approximately the same after normalization, the pronunciation system 100 determines that the system pronunciation is likely correct and, if the two numbers are not about the same after normalization, such as in the example shown in FIG. 1, the pronunciation system 100 determines that the system pronunciation is likely incorrect and that a new system pronunciation should be determined.

For example, the pronunciation system 100 determines a constant C for each n-gram in the typed queries 102 that also appears in the spoken queries 104 such that X is equal to C times Y ($X \approx C*Y$). The pronunciation system 100 then determines an average value for C based on all of the C values and a confidence interval around the average C value. For any value of C for a specific n-gram that is very difference from the confidence interval, the pronunciation system determines that the system pronunciation is likely incorrect. For example, if a constant $C_1$ has a value of 10.1 for a first n-gram (e.g., Caesar) and if a constant $C_1$ has a value of 11.5 for a second n-gram (e.g., Princess), while a third n-gram (e.g., Tsar) has a constant value $C_3$ of 1000, the pronunciation system 100 determines that the third n-gram has a bad pronunciation.

Figure 2:
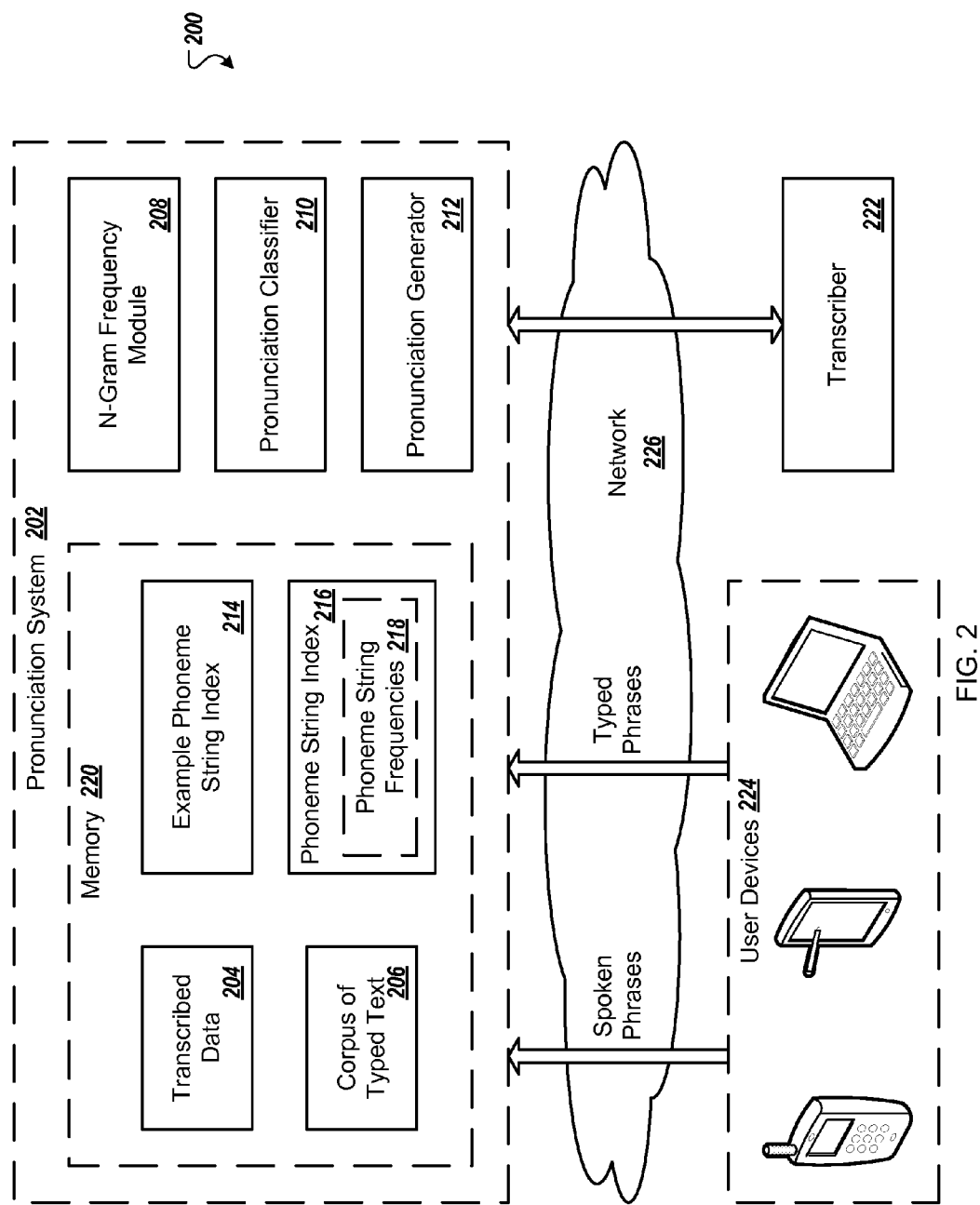
FIG. 2 is a block diagram of an environment in which system pronunciations are classified.

FIG. 2 is a block diagram of an environment 200 in which system pronunciations are classified. The environment 200 includes a pronunciation system 202 that classifies system pronunciations as occurring frequently in a plurality of spoken phrases included in transcribed data 204 (i.e., as likely correct) or as occurring infrequently in the plurality of spoken phrases (i.e., as potentially incorrect).

The pronunciation system 202 includes a corpus of typed text 206 and an n-gram frequency module 208 which determines the number of occurrences of a specific n-gram in the corpus of typed text 206, along with the number of occurrences of the specific n-gram in the transcribed data 204.

A pronunciation classifier 210 compares the number of occurrences of the specific n-gram in the corpus of typed text 206 with the number of occurrences of the specific n-gram in the transcribed data 204 to classify a system pronunciation associated with the specific n-gram as incorrect or correct. For example, if the number of occurrences of the specific n-gram in the corpus of typed text 206 is similar to the number of occurrences of the specific n-gram in the transcribed data 204, the pronunciation classifier 210 determines that the system pronunciation of the specific n-gram occurs frequently in the spoken phrases included in the transcribed data 204 and does not need to be changed. In another example, if the number of occurrences of the specific n-gram in the corpus of typed text 206 is similar to the number of occurrences of the specific n-gram in the transcribed data 204, the pronunciation classifier 210 determines that the system pronunciation of the specific n-gram is used to generate more correct transcriptions of the specific n-gram than the number of incorrect transcriptions of the specific n-gram.

Alternatively, if the difference between the number of occurrences in the corpus of typed text 206 and the number of occurrences in the transcribed data is greater than a predetermined threshold difference value, the pronunciation classifier 210 determines that the system pronunciation associated with the specific n-gram needs correction. In another example, if the number of occurrences of the specific n-gram in the corpus of typed text 206 is much smaller than the number of occurrences of the specific n-gram in the transcribed data 204, the pronunciation classifier 210 determines that the system pronunciation of the specific n-gram is used to generate more incorrect transcriptions of the specific n-gram than correct transcriptions of the specific n-gram.

For example, when both the transcribed data 204 and the corpus of typed text 206 contain large datasets, it is increasingly likely that the number of uses of each specific n-gram is similar between the transcribed data 204 and the corpus of typed text 206. When the n-gram frequency module 208 determines that there are few instances of a specific n-gram in the transcribed data 204 (e.g., near zero depending on the size of the dataset), the pronunciation system 202 determines that the system pronunciation used for transcription of the specific n-gram is potentially incorrect, assuming that there the number of instances of the specific n-gram in the corpus of typed text 206 is much greater. For example, the pronunciation system 202 may determine that a specific word in the specific n-gram is associated with an incorrect system pronunciation based on other n-grams that include the specific word.

A pronunciation generator 212 receives an indication from the pronunciation classifier 210 that specifies one or more words with system pronunciations that need to be updated and identifies potential pronunciations for the words.

In some implementations, when identifying potential pronunciations for a word, the pronunciation generator 212 generates one or more phoneme strings for each word associated with a system pronunciation that needs to be updated to determine possible phoneme strings for the specific words. The pronunciation generator 212 compares the generated phoneme strings with strings from an example phoneme string index 214, which includes one or more example phoneme strings generated from a plurality of spoken phrases, to determine which of the generated phoneme strings are associated with phrases that have been spoken by one or more users and are potential candidates for an updated system pronunciation. When the pronunciation generator 212 detects a phoneme string that does not match any example phoneme string from the example phoneme string index 214, the pronunciation generator 212 determines that the phoneme string is not a potential candidate and discards the phoneme string or associates the phoneme string with a confidence score or frequency of zero, where the confidence score indicates the likelihood that a particular phoneme string will generate the correct system pronunciation for the specific word.

For each of the phoneme strings that match an entry in the example phoneme string index 214, the pronunciation generator 212 determines a frequency associated with the phoneme string using a phoneme string index 216. For example, the pronunciation generator 212 determines the frequency based on a number of occurrences of the phoneme string in the phoneme string index 216. In another example, the phoneme string index 216 includes one or more phoneme string frequencies 218 and the pronunciation generator 212 determines the frequency of the phoneme string by looking up the frequency for the phoneme string in the phoneme string frequencies 218.

Alternatively, the pronunciation generator 212 may determine a confidence score for each phoneme string and the confidence score can be used instead of or in addition to the frequency.

The pronunciation generator 212 selects a potential pronunciation for a word associated with a system pronunciation that needs to be updated based on the frequencies associated with the phoneme strings. For example, the pronunciation generator 212 compares the frequencies associated with the phoneme strings with a threshold phoneme string frequency and selects a potential pronunciation based on the phoneme string with a frequency greater than the threshold phoneme string frequency. For example, the threshold phoneme string frequency is the frequency of the word in the corpus of typed text 206 or a value based on the frequency of the word in the corpus of typed text 206.

The pronunciation generator 212 may then provide the potential pronunciation to a transcriber 222 and obtain a transcription of at least one spoken n-gram where the transcriber 222 uses the potential pronunciation to transcribe a spoken n-gram. For example, the pronunciation generator 212 selects a potential pronunciation "zär" for the word "Tsar" and provides the potential pronunciation "zär" to the transcriber 222 where "zär" was the phoneme string with the highest frequency for the word "Tsar" detected by the pronunciation generator 212.

The transcribed data 204, the corpus of typed text 206, the example phoneme string index 214, and the phoneme string index 216 are stored in a memory 220. For example, the pronunciation system 202 receives one or more typed phrases from a plurality of user devices 224 and generates the corpus of typed text 206 from the typed phrases and stores the corpus of typed text 206 in the memory 220.

Similarly, the pronunciation system 202 receives one or more spoken phrases from the user devices 224, provides the spoken phrases to the transcriber 222 for transcription, and generates the transcribed data 204 from the transcribed phrases.

The user devices 224 may include personal computers, mobile communication devices, and other devices that can send and receive data over a network 226. The network 226, such as a local area network (LAN), wide area network (WAN), the Internet, or a combination thereof, connects the user devices 224 and the pronunciation system 202.

For example, one or more mobile devices may provide the typed search queries to a search engine and the search engine provides the typed phrases to the pronunciation system 202 in the form of the corpus of typed text 206. The search engine also receives a plurality of transcriptions of spoken search queries (e.g., from the transcriber 222), where the spoken search queries were generated on one or more mobile devices, and provides the transcriptions of the spoken search queries to the pronunciation system 202 in the form of the transcribed data 204. The pronunciation system 202 may then detect potential system pronunciation problems based on the transcribed data 204 and the corpus of typed text 206.

In this example, the corpus of typed text comprises typed query data where each entry in the typed query data includes at least one typed n-gram. In other implementations, the pronunciation system 202 generates the corpus of typed text from one or more books or is generated from one or more web pages.

The pronunciation system 202 includes one or more computers. For example, the n-gram frequency module 208, the pronunciation classifier 210, and the pronunciation generator 212 are executed on the same computer which also includes the memory 220. Alternatively, the n-gram frequency module 208, the pronunciation classifier 210, and the pronunciation generator 212 may be executed on different computers.

In some implementations, after the pronunciation generator 212 has identified one or more potential pronunciations for words associated with incorrect system pronunciations, the pronunciation system 202 receives updated transcriptions for the n-grams included in the transcribed data 204 from the transcriber 222, where the transcriber 222 uses the potential pronunciations during transcription, and determines updated frequencies for all of the n-grams to verify that the potential pronunciations are correct and the frequencies for the n-grams in the transcribed data are similar to the frequencies for the n-grams in the corpus of typed text.

In some implementations, the phoneme string index 216 is the same index as the example phoneme string index 214. In some implementations, the pronunciation system 202 generates the phoneme string index 216 from the corpus of typed text 206. In some implementations, the phoneme string index 216 and the corpus of typed text 206 are the same data stored in the memory 220.

In some implementations, the data stored in the transcribed data 204 and/or the corpus of typed text 206 is from a particular period of time. For example, when the transcribed data 204 includes transcriptions of spoken queries, the transcribed data 204 only includes data from a predetermined period of time, e.g., the past sixty days.

In some implementations, the pronunciation generator 212 uses the context of the specific word and/or adjacent n-grams when selecting potential pronunciations. For example, when the specific word is technology related, the pronunciation generator 212 selects potential pronunciations that are typically adjacent to other technology n-grams and discards any potential pronunciations that are not typically adjacent to other technology n-grams.

Figure 3:
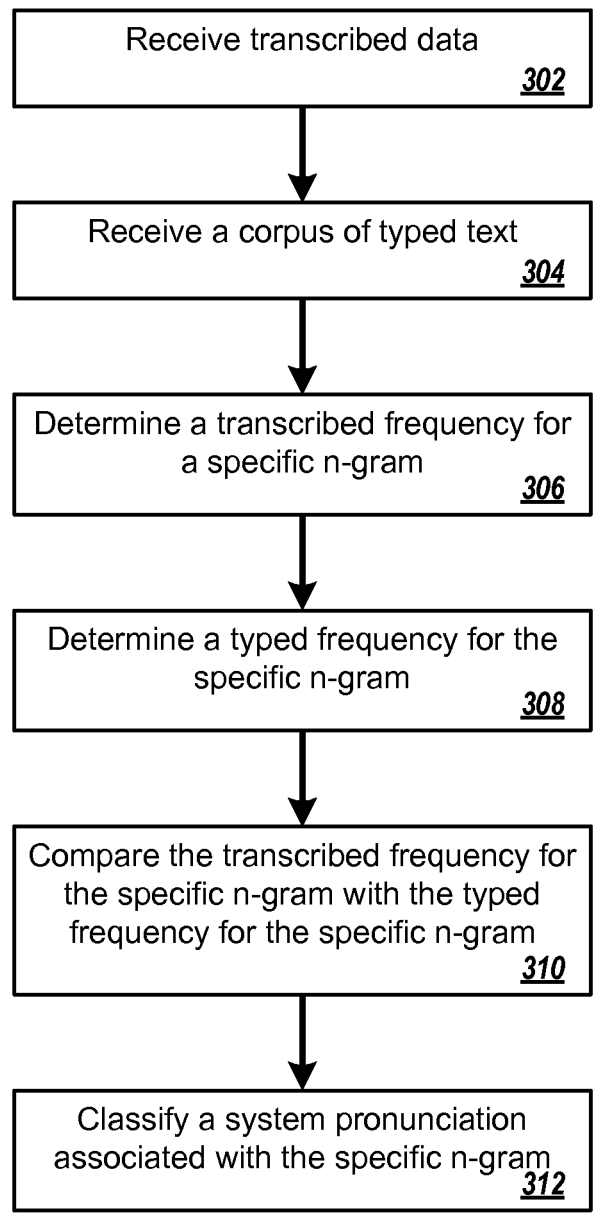
FIG. 3 is a flow diagram of a process for classifying a system pronunciation associated with a specific n-gram.

FIG. 3 is a flow diagram of a process 300 for classifying a system pronunciation associated with a specific n-gram. The process 300 can be used by one or more computers in the pronunciation system 202 to classify n-grams that are transcribed incorrectly as having or potentially having an incorrect system pronunciation.

The pronunciation system receives transcribed data (302). The transcribed data includes one or more transcribed n-grams. For example, the pronunciation system receives a transcription of "Russian tee-sars" for the spoken search query "Russian tsars."

The pronunciation system receives a corpus of typed text (304). The corpus of typed text includes a plurality of typed n-grams. For example, the pronunciation system receives a corpus of typed search n-grams.

In some implementations, the typed search n-grams are generated by the same type of device or devices as the transcribed data. For example, both the transcribed data and the corpus of typed text are generated by mobile devices.

The n-gram frequency module determines a transcribed frequency for a specific n-gram (306). The specific n-gram is selected from the typed n-grams included in the corpus of typed text and the transcribed frequency is based on a first quantity of occurrences in which the specific n-gram is one of the transcribed n-grams included in the transcribed data. For example, the n-gram frequency module determines that the n-gram "tsars," and any abbreviations or alternate spellings (e.g., a spelling with a different grammatical number) associated with the n-gram, occurs Y times in the transcribed data.

The n-gram frequency module determines a typed frequency for the specific n-gram (308). The typed frequency is based on a second quantity of occurrences in which the specific n-gram is one of the typed n-grams included in the corpus of typed text. For example, the n-gram frequency module determines that the n-gram "tsars," and any abbreviations or alternate spellings (e.g., a spelling with a different grammatical number) associated with the n-gram, occurs X times in the corpus of typed text.

In some implementations, the transcribed frequency and/or the typed frequency are based on the percentage of occurrences of the specific n-gram in the transcribed data or the corpus of typed text compared to the total number of n-grams in the transcribed data or the corpus of typed text. For example, if the n-gram "tsar" occurs in the corpus of typed text three times, and the total number of n-grams in corpus of typed text is eight, the typed frequency for "tsar" is 37.5%.

The pronunciation classifier compares the transcribed frequency for the specific n-gram with the typed frequency for the specific n-gram (310). For example, the pronunciation classifier determines if the transcribed frequency is similar to or within a threshold difference from the typed frequency.

In some implementations, the pronunciation system normalizes the transcribed frequency, the typed frequency, or both frequencies before comparing the two frequencies. The normalizing may be performed to reduce the likelihood that a domain mismatch would cause an incorrect classification of an n-gram.

For example, the pronunciation system may normalize one of the frequencies based on one or more contexts associated with the n-gram. A context for an n-gram may be determined based on a category associated with an n-gram, such as history, technology, science, biology, music genre, politics, electronic mail, news articles, search queries, entertainment, and/ or a physical location associated with a user device that generated an n-gram, to name a few examples. For example, when determining a frequency for "tsars," the pronunciation system may only count the occurrences of "tsars," and "tsar" for the n-gram that occur in "history" related spoken search queries for the transcribed frequency, and "history" related typed queries for the typed frequency. In another example, when determining a frequency for the n-gram "satellite" where the search query is associated with artificial satellites launched into space, the pronunciation system may select a context of "technology."

In some implementations, one or both of the frequencies may be normalized based on one or more n-grams adjacent to the specific n-gram when the specific n-gram appears in the transcribed data or the corpus of typed text. For example, only occurrences of "tsar" that have similar adjacent words in both the transcribed data and the corpus of typed text are used to determine the transcribed frequency and the typed frequency (e.g., based on clustering). When determining a frequency based on adjacent n-grams, the pronunciation system may also use synonyms, abbreviations, and alternate spellings for the adjacent n-grams in addition to the adjacent n-grams.

In some implementations, the normalization is based on a size ratio associated with the transcribed data and the corpus of typed text. For example, if history related queries occur in the corpus of typed text twice as often as in the transcribed data, the number of occurrences of "tsar" in the transcribed data can be doubled when determining the final transcribed frequency for the n-gram "tsar."

The pronunciation classifier classifies a system pronunciation associated with the specific n-gram (312). The classification indicates if the system pronunciation occurs frequently in a plurality of spoken phrases included in the transcribed data or occurs infrequently in the plurality of spoken phrases.

For example, the system may determine whether a difference between the transcribed frequency and the typed frequency is greater than a predetermined threshold difference value. If the difference is greater than the threshold difference value, the system classifies the system pronunciation as occurring infrequently in the plurality of spoken phrases and potentially in need of correction.

Alternatively, if the difference is not greater than the threshold difference value, the system classifies the system pronunciation as occurring frequently in the plurality of spoken phrases and not needing correction.

In some implementations, the pronunciation classifier determines that a system pronunciation associated with a specific word in the specific n-gram is incorrect based on frequencies associated with multiple n-grams that include the specific word. For example, the pronunciation system may determine frequencies for "tsar," "Russian tsar," and "Bulgarian tsar" where the frequencies of "tsar" in the transcribed data and the corpus of typed text are approximately the same, but the frequencies for "Russian tsar" and "Bulgarian tsar" are very different, indicating a potential system pronunciation problem for the word "tsar" assuming that other n-gram frequencies for "Russian" and "Bulgarian" are approximately the same in both the transcribed data and the corpus of typed text.

Alternatively, if the frequencies for "tsar," "Russian tsar," and "Bulgarian tsar" are approximately the same in both the transcribed data and the corpus of typed text, the pronunciation system determines that the pronunciation for the word "tsar" is correct.

In some implementations, the pronunciation classifier classifies the system pronunciation as occurring infrequently in the plurality of spoken phrases when the difference between the typed frequency and the transcribed frequency is greater than the threshold difference value and the typed frequency is greater than the transcribed frequency. For example, the pronunciation classifier determines that the transcribed frequency is much greater than the typed frequency by more than a threshold difference value and that the n-gram occurs often in the transcribed data. Here the pronunciation classifier may determine that more spoken search queries use the specific n-gram than typed queries, but that the system pronunciations for the words included in the n-gram are correct and do not need correction.

In some implementations, the process 300 can include additional steps, some of the steps can be performed in a different order, or some of the steps can be divided into multiple steps. For example, the system can receive the corpus of typed text and determine the typed frequency for the specific n-gram prior to receiving the transcribed data.

In some implementations, the pronunciation system receives one or more spoken phrases where at least one of the spoken phrases includes the specific n-gram and each of the spoken phrases includes at least one spoken n-gram. For example, prior to receiving the transcribed data, the pronunciation system receives spoken data generated by one or more user devices. The pronunciation system may receive the spoken data directly from the user devices or from another system, such as a search engine that initially receives the spoken data.

The pronunciation system obtains a transcription of at least one of the spoken phrases to determine one or more transcribed n-grams, where at least one of the transcriptions of the specific n-gram is incorrect. For example, the pronunciation system provides the spoken phrases to a transcriber which provides the pronunciation system with transcriptions of the n-grams in the spoken phrases. Alternatively, the search engine provides the spoken phrases to the transcriber and the transcriber provides the transcribed phrases to the pronunciation system.

The pronunciation system generates transcribed data from the transcribed n-grams. For example, the pronunciation system uses each of the transcribed phrases as an entry in the transcribed data. As the pronunciation system receives additional transcriptions of spoken phrases, and additional data for the corpus of typed text, the pronunciation system updates the respective data memory.

The pronunciation system may then perform the process 300 using the transcribed data from the transcribed n-grams to classify a system pronunciation associated with the specific n-gram as occurring frequently (i.e., the system pronunciation is typically used in user queries) or as occurring infrequently (i.e., the system pronunciation typically is not used in user queries and the system pronunciation may need to be updated).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 4:
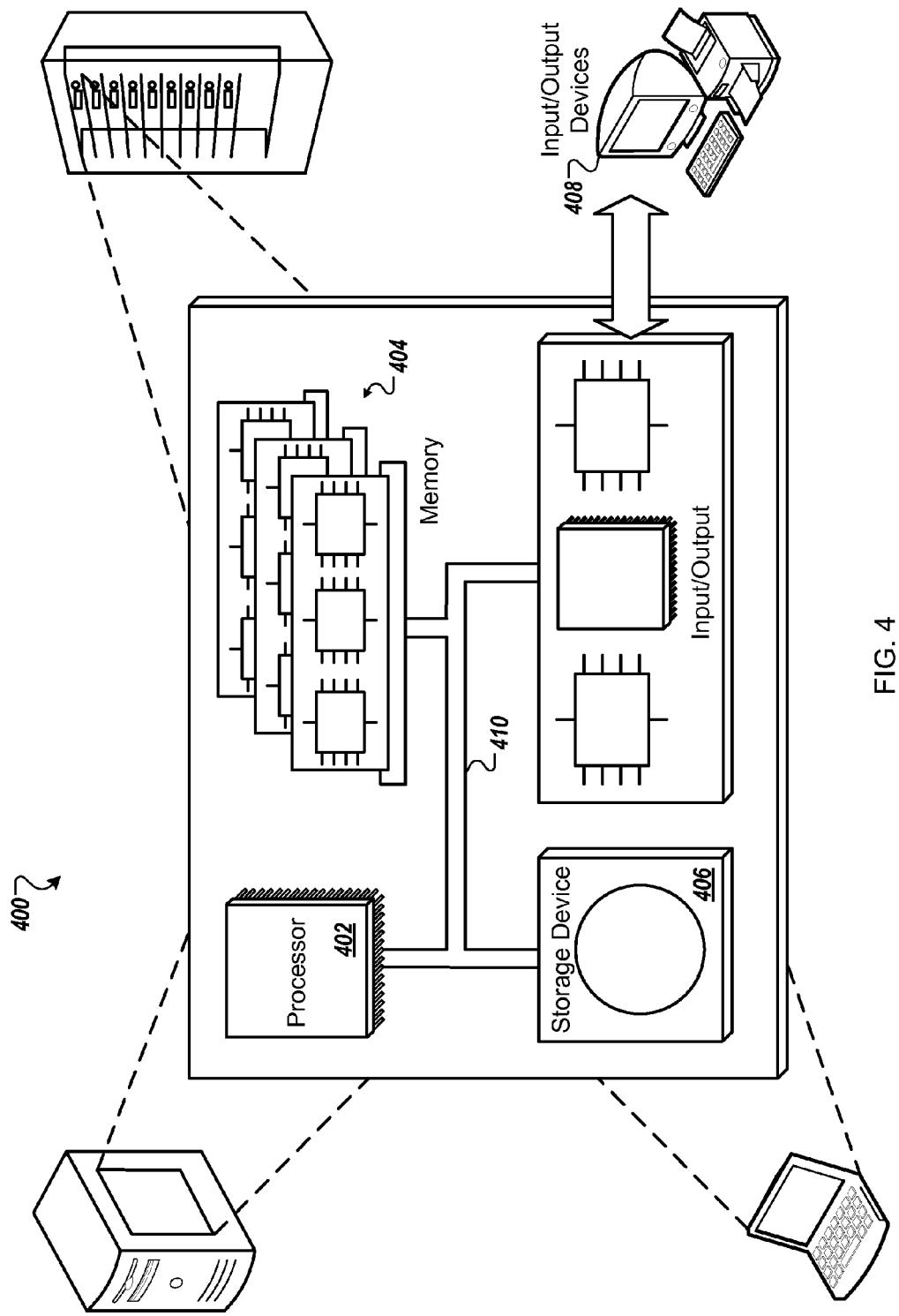
FIG. 4 is a block diagram of a computing system that can be used in connection with computer-implemented methods described in this document.

An example of one such type of computer is shown in FIG. 4, which shows a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving, by one or more computers, transcribed data from a speech recognition system, wherein the transcribed data includes one or more first transcribed n-grams;
   receiving, by at least one of the computers, a corpus of typed text including a plurality of typed n-grams;
   determining a transcribed frequency for a specific n-gram, the specific n-gram being one of the typed n-grams included in the corpus of typed text, the transcribed frequency being based on a first quantity of occurrences in which the specific n-gram is one of the first transcribed n-grams included in the transcribed data;

determining a typed frequency for the specific n-gram, the typed frequency being based on a second quantity of occurrences in which the specific n-gram is one of the typed n-grams included in the corpus of typed text;

comparing the transcribed frequency for the specific n-gram with the typed frequency for the specific n-gram; and classifying, based on the comparing, a system pronunciation associated with the specific n-gram as occurring frequently in a plurality of spoken phrases included in the transcribed data or occurring infrequently in the plurality of spoken phrases, wherein the system pronunciation is for use by the speech recognition system in transcribing future utterances.

2. The computer-implemented method of claim 1, further comprising:

receiving one or more spoken phrases, at least one of the spoken phrases including the specific n-gram and each of the spoken phrases including at least one spoken n-gram;

obtaining a transcription of at least one of the spoken phrases to determine one or more second transcribed n-grams, at least one of the transcriptions of the specific n-gram being incorrect; and generating the transcribed data from the second transcribed n-grams.

3. The computer-implemented method of claim 1, further comprising:

generating, based on the classifying, one or more candidate phoneme strings for a specific word included in the specific n-gram;

determining, for each of the candidate phoneme strings, whether the candidate phoneme string is the same as an example phoneme string, the example phoneme string being selected from an example phoneme string index;

determining, for each of the candidate phoneme strings that is the same as one of the example phoneme strings, a candidate phoneme string frequency for the associated candidate phoneme string based on a phoneme string index; and selecting a potential pronunciation for the specific word based on the candidate phoneme string frequencies, the potential pronunciation being from the candidate phoneme strings associated with the candidate phoneme string frequencies.

4. The computer-implemented method of claim 3, further comprising obtaining a transcription of at least one spoken n-gram using the potential pronunciation for the specific word.

5. The computer-implemented method of claim 1, further comprising normalizing one of the transcribed frequency for the specific n-gram or the typed frequency for the specific n-gram.

6. The computer-implemented method of claim 5, wherein the normalizing is based on one or more n-grams adjacent to the specific n-gram when the specific n-gram appears in the transcribed data when the transcribed frequency is normalized or based on one or more n-grams adjacent to the specific n-gram when the specific n-gram appears in the corpus of typed text when the typed frequency is normalized.

7. The computer-implemented method of claim 5, wherein the normalizing is based on a context associated with the specific n-gram.

8. The computer-implemented method of claim 1, wherein the classifying comprises:

determining whether a difference between the transcribed frequency and the typed frequency is greater than a threshold difference value; and classifying, based on determining that the difference is greater than the threshold difference value, the system pronunciation associated with the specific n-gram as occurring infrequently in the plurality of spoken phrases and in need of correction.

9. A non-transitory computer storage medium encoded with instructions that, when executed by one or more computers, cause the one or more computers to perform operations comprising:

receiving, by at least one of the computers, transcribed data from a speech recognition system, wherein the transcribed data includes one or more first transcribed n-grams;

receiving, by at least one of the computers, a corpus of typed text including a plurality of typed n-grams;

determining a transcribed frequency for a specific n-gram, the specific n-gram being one of the typed n-grams included in the corpus of typed text, the transcribed frequency being based on a first quantity of occurrences in which the specific n-gram is one of the first transcribed n-grams included in the transcribed data;

determining a typed frequency for the specific n-gram, the typed frequency being based on a second quantity of occurrences in which the specific n-gram is one of the typed n-grams included in the corpus of typed text;

comparing the transcribed frequency for the specific n-gram with the typed frequency for the specific n-gram; and classifying, based on the comparing, a system pronunciation associated with the specific n-gram as occurring frequently in a plurality of spoken phrases included in the transcribed data or occurring infrequently in the plurality of spoken phrases, wherein the system pronunciation is for use by the speech recognition system in transcribing future utterances.

10. The computer storage medium of claim 9, further comprising:

receiving one or more spoken phrases, at least one of the spoken phrases including the specific n-gram and each of the spoken phrases including at least one spoken n-gram;

obtaining a transcription of at least one of the spoken phrases to determine one or more second transcribed n-grams, at least one of the transcriptions of the specific n-gram being incorrect; and generating the transcribed data from the second transcribed n-grams.

11. The computer storage medium of claim 9, further comprising:

generating, based on the classifying, one or more candidate phoneme strings for a specific word included in the specific n-gram;

determining, for each of the candidate phoneme strings, whether the candidate phoneme string is the same as an example phoneme string, the example phoneme string being selected from an example phoneme string index;

determining, for each of the candidate phoneme strings that is the same as one of the example phoneme strings, a candidate phoneme string frequency for the associated candidate phoneme string based on a phoneme string index; and selecting a potential pronunciation for the specific word based on the candidate phoneme string frequencies, the potential pronunciation being from the candidate phoneme strings associated with the candidate phoneme string frequencies.

12. The computer storage medium of claim 9, further comprising normalizing one of the transcribed frequency for the specific n-gram or the typed frequency for the specific n-gram.

13. The computer storage medium of claim 12, wherein the normalizing is based on a context associated with the specific n-gram.

14. The computer storage medium of claim 9, wherein the classifying comprises:
  determining whether a difference between the transcribed frequency and the typed frequency is greater than a threshold difference value; and
  classifying, based on determining that the difference is greater than the threshold difference value, the system pronunciation associated with the specific n-gram as occurring infrequently in the plurality of spoken phrases and in need of correction.

15. A system comprising:
  one or more computers and one or more storage devices storing instructions that are operable, when executed by the one or more computers, to cause the one or more computers to perform operations comprising:
  receiving, by at least one of the computers, transcribed data from a speech recognition system, wherein the transcribed data includes one or more first transcribed n-grams;
  receiving, by at least one of the computers, a corpus of typed text including a plurality of typed n-grams;
  determining a transcribed frequency for a specific n-gram, the specific n-gram being one of the typed n-grams included in the corpus of typed text, the transcribed frequency being based on a first quantity of occurrences in which the specific n-gram is one of the first transcribed n-grams included in the transcribed data;
  determining a typed frequency for the specific n-gram, the typed frequency being based on a second quantity of occurrences in which the specific n-gram is one of the typed n-grams included in the corpus of typed text;
  comparing the transcribed frequency for the specific n-gram with the typed frequency for the specific n-gram; and
  classifying, based on the comparing, a system pronunciation associated with the specific n-gram as occurring frequently in a plurality of spoken phrases included in the transcribed data or occurring infrequently in the plurality of spoken phrases, wherein the system pronunciation is for use by the speech recognition system in transcribing future utterances.

16. The system of claim 15, further comprising:
  receiving one or more spoken phrases, at least one of the spoken phrases including the specific n-gram and each of the spoken phrases including at least one spoken n-gram;
  obtaining a transcription of at least one of the spoken phrases to determine one or more second transcribed n-grams, at least one of the transcriptions of the specific n-gram being incorrect; and
  generating the transcribed data from the second transcribed n-grams.

17. The system of claim 15, further comprising:
  generating, based on the classifying, one or more candidate phoneme strings for a specific word included in the specific n-gram;
  determining, for each of the candidate phoneme strings, whether the candidate phoneme string is the same as an example phoneme string, the example phoneme string being selected from an example phoneme string index;
  determining, for each of the candidate phoneme strings that is the same as one of the example phoneme strings, a candidate phoneme string frequency for the associated candidate phoneme string based on a phoneme string index; and
  selecting a potential pronunciation for the specific word based on the candidate phoneme string frequencies, the potential pronunciation being from the candidate phoneme strings associated with the candidate phoneme string frequencies.

18. The system of claim 15, further comprising normalizing one of the transcribed frequency for the specific n-gram or the typed frequency for the specific n-gram.

19. The system of claim 18, wherein the normalizing is based on a context associated with the specific n-gram.

20. The system of claim 15, wherein the classifying comprises:
  determining whether a difference between the transcribed frequency and the typed frequency is greater than a threshold difference value; and
  classifying, based on determining that the difference is greater than the threshold difference value, the system pronunciation associated with the specific n-gram as occurring infrequently in the plurality of spoken phrases and in need of correction.

\* \* \* \* \*